April 29, 1947.      G. J. HENRY      2,419,642
PIPE COUPLING
Filed Aug. 17, 1945
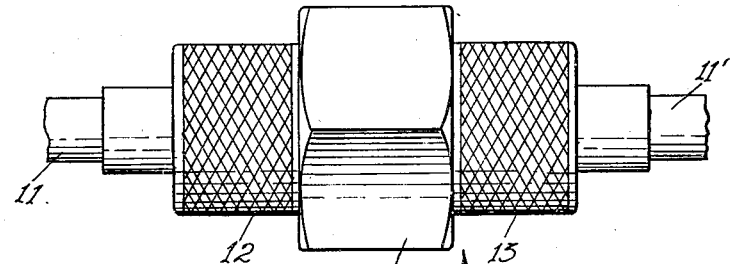
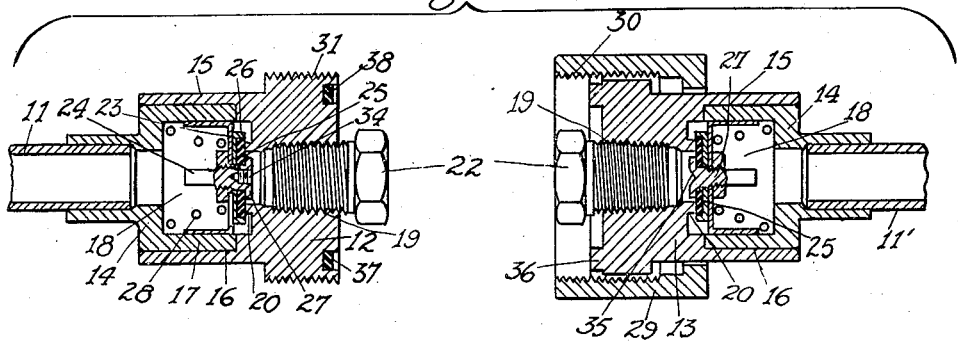
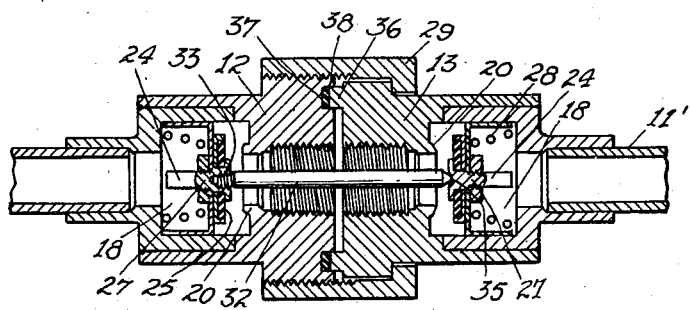
INVENTOR.
Guy J. Henry
BY
Cromwell, Greist & Warden
ATTORNEYS Patented Apr. 29, 1947

2,419,642

UNITED STATES PATENT OFFICE 2,419,642

PIPE COUPLING

Guy J. Henry, Chicago, Ill.

Application August 17, 1945, Serial No. 611,002

2 Claims. (Cl. 284—19)

The present invention relates generally to pipe or like fluid couplings; more particularly it relates to a valved coupling which normally closes an otherwise exposed fluid communication or flow line prior to its connection with a similar coupling, and which automatically establishes communication through the resultant line and couplings each time the latter are operatively connected.

An object of the invention is to provide a coupling of the above type which is simple and compact in construction and inexpensively manufactured, and which permits the aforesaid interconnection of a fluid pressure line with another line in which pressure may or may not exist, without interrupting said pressure and without the need of providing either line with individual external and manually controlled valve means.

A further object is to provide a coupling for application to the extremity of one conduit or pipe prior to coupling the same with a similarly equipped pipe; which unfailingly establishes full communication in the pipes when the coupling is effected; which unfailingly closes the line of flow through the pipes if the same are subsequently disconnected; which is devoid of projecting or exposed parts in unconnected condition, to prevent inadvertent opening of the line; and which has removable means preventing entry of dirt into the line in said condition.

The foregoing statements are indicative in a general way of the nature of the invention, but other and more specific objects will be apparent to those skilled in the art upon a full understanding of the construction and operation of the device.

A single embodiment of the invention is presented herein for the purpose of exemplification, but it will be appreciated that the invention is susceptible of incorporation in other modified forms coming equally within the scope of the appended claims.

In the drawings:

Fig. 1 is a fragmentary view in elevation, illustrating the exterior of the coupling in accordance with my invention operatively applied to a pair of coacting pipes or like fluid handling members;

Fig. 2 is a view in longitudinal vertical section illustrating coacting coupling members in spread relation prior to junction thereof by the coupling of the invention;

Fig. 3 is a view generally similar to Fig. 2, illustrating the coupling members in joined operative position with a fluid flow line established therebetween; and Fig. 4 illustrates the valve unseating rod or element constituting part of the present combination.

Referring to the drawing, the reference numeral 10 in general designates the coupling of this invention, adapted to join a pair of aligned pipes or other similar fluid flow conduits, designated 11, 11'. Coupling 10 comprises a pair of similar coupling members 12, 13, appropriately secured, as by sweating or soldering to the free or exposed ends of the pipes 11, 11' respectively. A hollow circular fitting 14, constituting an internal housing for each of the coupling members 12, 13, is secured in such manner on the pipe ends. Each of the coupling members further comprises an external housing member 15 which is counterbored at 16 and frictionally telescoped over and sweated to the axially extending, annular wall or flange 17 of the internal housing 14. This wall 17, in conjunction with the outer member 15, defines an internal valve chamber 18 communicating with the exterior of the member 15 through a tapped port 19 in said member which is disposed coaxially with pipe 11 or 11'. An annular, axially extending valve seat 20 is provided at the inner end of said port, said seat facing internally of chamber 18. The port is tapped for the purpose of receiving a threaded closure plug 22 serving to exclude dirt from port 19 and the interior of chamber 18, which otherwise would foul seat 20 and clog the chamber interior, when coupling members 12, 13 were separated. Said plugs also seal the ports 19 against the loss of fluid or fluid pressure should the internal valves in chamber 18 (to be described) have any tendency to leak while the members 12, 13 are uncoupled.

A stamped valve carrier and guide member 23 is floatingly mounted for axial movement in the chamber 18, having axially extending guide and stop legs 24 slidably engaging the internal wall of the chamber. A valve 25 of leather, rubber or other appropriate material is disposed in a cuplike disk 26 on the end of guide 23; and a screw 27 and coacting nut secure the thus constituted valve to the guide member 23 for movement therewith. The guide 23 is urged axially of the chamber, for sealing engagement of valve 25 with seat 20 by means of a coil spring 28 engaging the rear of said guide and bearing at its opposite end against the fitting 14. It should be noted that valve 25 and guide 23 are disposed in their entirety in chamber 18 a substantial distance away from the mouth of port 19, hence are not subject to inadvertent impacts effective to unseat the valve. When the plug 22 is in place the port and valve are totally closed and protected.

One of the coacting coupling members 15 is provided with a conventional nut-like union element 29 slidable axially on the exterior thereof and provided with internal threads 30 which engage external threads 31 on the other member 15 to join the coupling members 12, 13, when desired.

A valve opening thrust rod 32 completes the coupling assembly, said rod being threaded at one end 33 for fixed reception in a threaded seat 34 on one of the valve fastening screws 27.

Prior to assembly, the coupling members 12, 13, appear as illustrated in Fig. 2, with the plugs 22 in place, sealing and protecting the chamber 18 and valve 25. When the coupling is to be perfected, these plugs are removed and the thrust rod 32 screwed in place in its seat 34 so as to extend coaxially with the associated chamber 18 through the port 19 and a substantial distance beyond the mouth of the latter. The members 12, 13 are then brought together by screwing union 29 on threads 31 of the other member, whereupon the free end of rod 32 engages the adjacent valve-securing screw 27, a depression 35 being provided therein for this purpose. Such depression might of course be provided merely by duplicating the threaded rod receiving seat 34 on each valve. Further compression of the rod resulting from screwing the union into place causes the valves 25 to be thrust apart with resultant unseating thereof from the seats 20 and establishment of full communication through the coupling. Guide legs 24 guide the valve accurately in this floating movement.

Were the springs 28 in the respective chambers 18 of unequal strength, the possibility would exist of only one of the valves being fully unseated. Therefore, to avoid such occurrence I provide a thrust rod 32 of sufficient length to insure opening of both valves, this in turn by causing at least one thereof to be thrust sufficiently away from its seat 20 to effect engagement of its guide and stop legs 24 with the rear of chamber 18. In such position rod 32 projects sufficiently into the other port 19 to engage and unseat the opposite valve fully.

Such unseating action takes place immediately and automatically upon union of the coupling members. To prevent leakage during the taking up of the union 29, the members 15 are provided respectively with an annular sealing shoulder 36, a coacting groove 37, and a compressible washer 38 in the latter engaged by the shoulder.

In the event that the coupling is disconnected, separation of the members 15 is attended by immediate and automatic seating of the valves, in an obvious manner.

The above coupling is fluid tight, exceedingly simple and inexpensive in structure and unfailing in operation, as will be readily appreciated by those skilled in the art. The parts are largely standard for either of the two coacting coupling members and, by being located internally insure against accidental actuation prior to complete coupling. Nevertheless, should it be desired to bleed either side of the line prior to coupling this is readily possible. When not in use the parts are fully shielded by plugs 22 so that loss or leakage due to inadvertent unseating of the valve is impossible.

I claim:

1. A coupling device adapted to communicate a pair of fluid handling members, comprising a coupling element engageable on one of said members, said element communicating said member with the exterior through an internal valve seat, a yieldably urged valve in said element engageable with said seat to prevent flow of fluid therethrough, and a valve unseating element normally disconnected from the valve in the uncoupled condition of said coupling element and disposable in fixed engagement with said valve for thrust engagement with the valve of a like coupling element, to thereby unseat both valves when said coupling elements are drawn together, said unseating element and first named valve having releasable interconnection for ready removal of the unseating element from said valve without dismantling the coupling element.

2. A pipe or like coupling device adapted to communicate a pair of fluid transmission members, comprising externally ported coupling elements on said members providing valve chambers, each of said chambers having an internal valve seat between the chamber and the port of the element, valves in said chambers normally engageable with said seats in the uncoupled relation of the members to prevent flow of fluid therethrough, supports for the valves in the respective chambers, means securing the valves to said respective supports, springs normally urging said valves against said seats, a valve unseating element separate from said last named means, means to removably secure said unseating element to one of the valves for thrust engagement between said valves to unseat both thereof when said members are in operative communicating relation, and means engageable with the couplings on said aligned members to maintain the same in said relation, said unseating element being proportioned to unseat both valves when operatively compressed therebetween and being readily removable from the valve to which it is secured without dismantling the coupling element in which that valve is disposed.

GUY J. HENRY.

REFERENCES CITED

The following references are of record in the file of this patent:

UNITED STATES PATENTS

| Number | Name | Date |
| --- | --- | --- |
| 2,359,648 | Jones | Oct. 3, 1944 |
| 2,061,012 | Wade | Nov. 17, 1936 |
| Re. 8,337 | Gardner et al. | July 16, 1878 |
| 1,796,077 | Boosey | Mar. 10, 1931 |
| 747,733 | Lafferty | Dec. 22, 1903 |
| 1,542,173 | Reynolds | June 16, 1925 |
| 803,648 | Williams | Nov. 7, 1905 |
| 1,013,418 | Michaelson | Jan. 2, 1912 |
| 373,256 | Traver et al. | Nov. 15, 1887 |